United States Patent
Wu et al.

(10) Patent No.: US 12,441,638 B2
(45) Date of Patent: Oct. 14, 2025

(54) TREATMENT METHOD OF LEACHATE OF HAZARDOUS WASTE LANDFILL SITE

(71) Applicant: Dongjiang Environmental Company Limited, Guangdong (CN)

(72) Inventors: Wenbiao Wu, Guangdong (CN); Wenbin Xu, Guangdong (CN); Menglan Xu, Guangdong (CN); Weining Qin, Guangdong (CN)

(73) Assignee: Dongjiang Environmental Company Limited, Shenzhen (CN)

( * ) Notice: Subject to any disclaimer, the term of this patent is extended or adjusted under 35 U.S.C. 154(b) by 302 days.

(21) Appl. No.: 18/014,118

(22) PCT Filed: Dec. 29, 2021

(86) PCT No.: PCT/CN2021/142247
§ 371 (c)(1),
(2) Date: Dec. 30, 2022

(87) PCT Pub. No.: WO2023/103119
PCT Pub. Date: Jun. 15, 2023

(65) Prior Publication Data
US 2024/0092663 A1     Mar. 21, 2024

(30) Foreign Application Priority Data
Dec. 10, 2020   (CN) .......................... 202111502275.1

(51) Int. Cl.
C02F 1/04       (2023.01)
C02F 1/38       (2023.01)
(Continued)

(52) U.S. Cl.
CPC .................. C02F 1/66 (2013.01); C02F 1/04 (2013.01); C02F 1/38 (2013.01); C02F 1/5245 (2013.01);
(Continued)

(58) Field of Classification Search
CPC ...... C02F 1/38; C02F 1/66; C02F 1/76; C02F 2001/5218; C02F 2103/06
See application file for complete search history.

(56) References Cited

FOREIGN PATENT DOCUMENTS

| CN | 101234767 A | 8/2008 |
|----|-------------|--------|
| CN | 101613085 A | 12/2009 |

(Continued)

OTHER PUBLICATIONS

Peng, Sai-jun et al—CN 105819401 A machine translation—Aug. 3, 2016 (Year: 2016).*

(Continued)

*Primary Examiner* — Bradley R Spies

(57) ABSTRACT

The present disclosure relates to the field of water treatment technologies, and in particular to a treatment method of a leachate from hazardous waste landfill site. The key points of the technical scheme were as follows: adding sodium carbonate to the leachate to obtain a calcium carbonate residue and a first waste liquid; adding hydrochloric acid to the first waste liquid to obtain a first mixed solution; heating the first mixed solution and introducing a given amount of chlorine gas into the first mixed solution while introducing air, to obtain a second waste liquid and a first mixed gas; introducing the first mixed gas into an alkaline liquid absorption tower; heating the second waste liquid to obtain an evaporation condensate water and a concentrated liquid; centrifuging the concentrated liquid to obtain a sodium chloride wet salt and a centrifuged liquid.

3 Claims, 1 Drawing Sheet

(51) Int. Cl.
*C02F 1/52* (2023.01)
*C02F 1/66* (2023.01)
*C02F 103/06* (2006.01)
*C02F 101/12* (2006.01)

(52) U.S. Cl.
CPC .. *C02F 2001/5218* (2013.01); *C02F 2101/12* (2013.01); *C02F 2103/06* (2013.01); *C02F 2209/02* (2013.01); *C02F 2209/06* (2013.01); *C02F 2209/44* (2013.01)

(56) References Cited

FOREIGN PATENT DOCUMENTS

| | | | | |
|---|---|---|---|---|
| CN | 101691239 A | | 4/2010 | |
| CN | 103407965 A | | 11/2013 | |
| CN | 105819401 A | | 8/2016 | |
| CN | 106315984 B | * | 5/2019 | ............ C02F 11/008 |
| CN | 110372143 A | * | 10/2019 | |
| CN | 111661979 A | | 9/2020 | |
| JP | 2010149076 A | | 7/2010 | |

OTHER PUBLICATIONS

Bian, Yan-yong et al—CN 106315984 B machine translation merged—May 31, 2019 (Year: 2019).*
Qiu, Ming-jian et al—CN 110372143 A machine translation merged—Oct. 25, 2019 (Year: 2019).*
International Search Report of PCT/CN2021/142247.

* cited by examiner

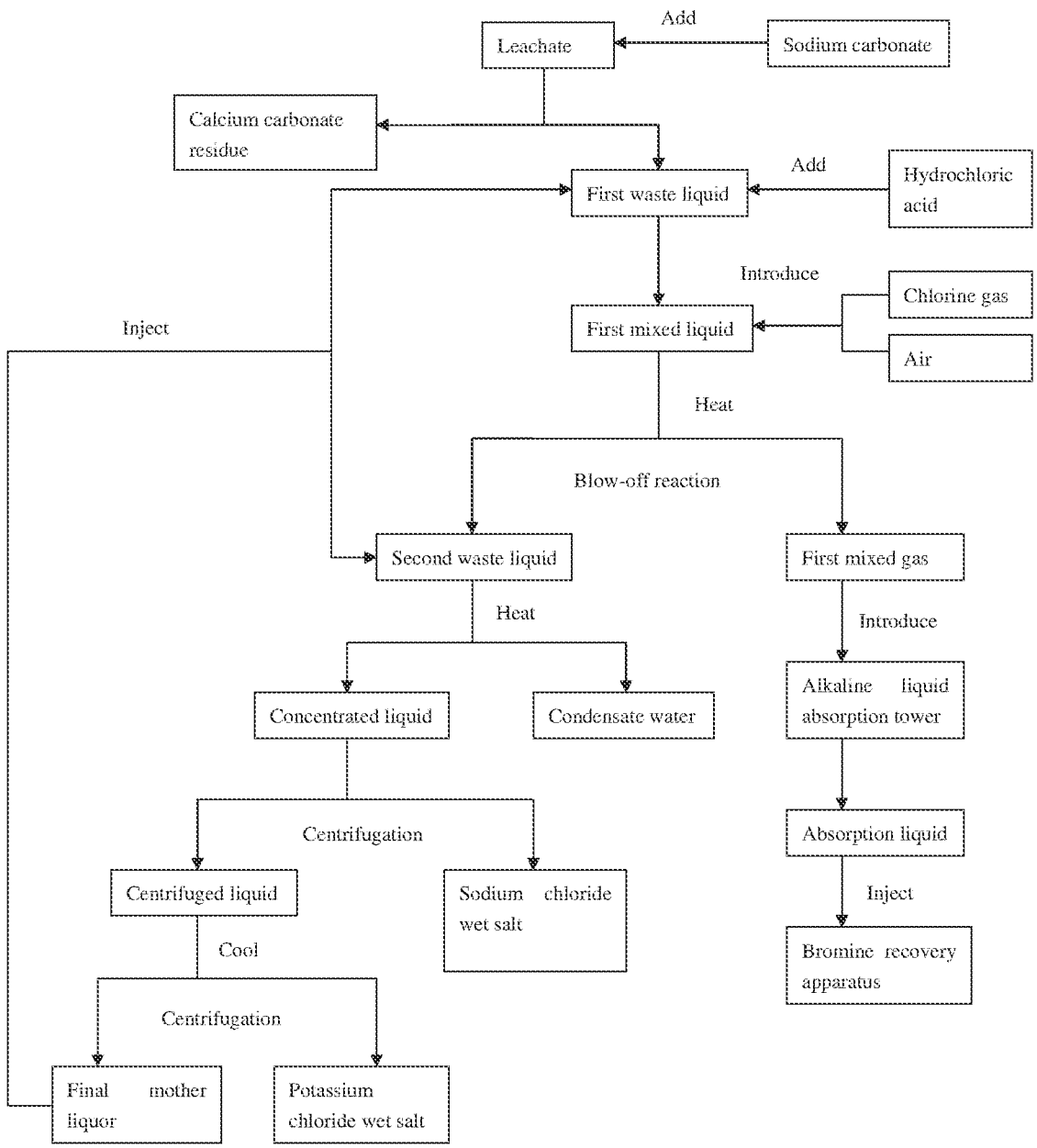

TREATMENT METHOD OF LEACHATE OF HAZARDOUS WASTE LANDFILL SITE

CROSS-REFERENCE TO RELATED APPLICATIONS

This application is a national stage application of PCT/CN2021/142247. This application claims priorities from PCT Application No. PCT/CN2021/142247, filed Dec. 29, 2021, and from the Chinese patent application 202111502275.1 filed Dec. 10, 2020, the content of which are incorporated herein in the entirety by reference.

TECHNICAL FIELD

The present disclosure relates to the field of water treatment technologies, and in particular to a treatment method of a leachate from hazardous waste landfill site.

BACKGROUND

Hazardous wastes buried in hazardous waste landfill sites usually include wastes with high soluble salt content, such as incineration ashes, evaporation salt mud, and the like. These hazardous wastes may have a lower soluble salt content after being stabilized and solidified. However, it is inevitable that some salts may dissolve into a leachate of the landfill sites. Generally, the leachate is a mixed solution mainly composed of calcium chloride, sodium chloride, and potassium chloride, and contains a small amount of bromide, sulfate, and nitrate. With a hazardous waste landfill site in Shenzhen as an example, the major ingredients of the leachate of the hazardous waste landfill site are calcium chloride at 10.33 wt %, sodium chloride at 6.00 wt %, and potassium chloride at 4.96 wt % as well as a small amount of other ingredients such as bromide 6560 mg/L, sulfate 519 mg/L, nitrate 310 mg/L, and heavy metal(calculated by Pb) 50 mg/L, and the like. The leachate has a pH value of 10.78 and a density of 1.15 $g/cm^3$.

At present, there are no treatment research reports for such waste liquids at home and abroad. Basically, the conventional process of "physicochemical pretreatment+evaporation+biochemical treatment" is adopted, where salt slurry obtained through evaporation is returned to a landfill site for backfilling. However, due to high calcium chloride content, direct evaporation of such waste liquids under alkaline condition will cause scaling to an evaporator. Further, due to a high solubility of calcium chloride, it is very difficult to separate out solids by direct evaporation (e.g. MVR evaporation). Even though a triple-effect evaporation can be used to separate out solids, the separated solids are a mixed salt that needs to be disposed of separately, wasting a large amount of valuable resources. Furthermore, in the case of evaporation under alkaline condition, condensed water has a higher content of ammonia nitrogen, which is harmful for subsequent biochemical treatment. In the case of evaporation under acid condition, condensed water will have a lower content of ammonia nitrogen and scaling formation will be reduced. However, due to a high bromine content in a system, hydrogen bromide will have a serious corrosion effect on the evaporator under high temperatures. Even if the evaporator is made from titanium, the tubes of the evaporator will be penetrated for corrosion in two or three months.

SUMMARY

In order to address the shortcomings in the prior arts, the present disclosure provides a treatment method of a leachate from hazardous waste landfill site, which can not only realize resource-oriented recovery for sodium chloride and potassium chloride in the leachate but also effectively avoid corrosion of hydrogen bromide to an evaporator.

The technical object of the present disclosure is achieved by the following technical scheme: a treatment method of a leachate from hazardous waste landfill site. The method includes the following steps:

at step 1, adding sodium carbonate for completely removing calcium ions in the leachate to the leachate for 30 min of reaction and then obtaining a calcium carbonate residue and a first waste liquid through filtration;

at step 2, adding hydrochloric acid to the first waste liquid and adjusting a pH value to obtain a first mixed solution;

at step 3, heating the first mixed solution to 80° C., and then introducing a given amount of chlorine gas to the first mixed solution while introducing air for performing blow-off reaction and then obtaining a second waste liquid and a first mixed gas;

at step 4, introducing the first mixed gas into an alkaline liquid absorption tower to obtain an absorption liquid and feeding the absorption liquid into a bromine recovery apparatus for recovering bromine;

at step 5, heating the second waste liquid to 100° C. to enable the second waste liquid to be evaporated so as to obtain an evaporation condensate water and a concentrated liquid;

at step 6, centrifuging the concentrated liquid to obtain a sodium chloride wet salt and a centrifuged liquid;

at step 7, pumping the centrifuged liquid into a cooling crystallization tank, such that, when the centrifuged liquid is cooled to 40° C., a potassium chloride wet salt and a final mother liquor are obtained by centrifugation;

at step 8, returning the final mother liquor to the first waste liquid or the second waste liquid for recycling.

In an embodiment, the first mixed solution has a pH value of 4.0 to 6.0.

In an embodiment, the chlorine gas is prepared by chemical reaction or by electrolyzing a sodium chloride solution.

The above treatment method of a leachate from hazardous waste landfill site has the following beneficial effects.

Firstly, in the present disclosure, calcium is removed by pre-treatment, and the pH value of the calcium-removed leachate is adjusted to acid, such that $CaCl_2$) in the leachate and sodium carbonate added slightly excessively can be converted into NaCl, that is, the quaternary system $CaCl_2$—NaCl—KCl—$H_2O$ in the raw water is degraded to a ternary system NaCl—KCl—$H_2O$, thus greatly reducing the difficulty of subsequent treatment of salt separation.

Secondly, in the present disclosure, bromine ions in the leachate can be removed in advance through a bromine removal tower to avoid corrosion of hydrogen bromide on the evaporator. At the same time, the effects of bromide on subsequent salt separation process and purity of separated salt products can be avoided.

Thirdly, in the present disclosure, through evaporation crystallization and cooling crystallization, resource-oriented recovery for sodium chloride and potassium chloride can be achieved.

BRIEF DESCRIPTIONS OF THE DRAWINGS

FIG. 1 is a schematic diagram of a flowchart according to one or more embodiments of the present disclosure.

DETAILED DESCRIPTIONS OF EMBODIMENTS

The present disclosure will be detailed below in combination with the drawings and specific embodiments.

In the descriptions of the present disclosure, it is understood that orientations or positional relationships indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" are based on the orientations or positional relationships of the drawings and are used only for ease of descriptions and simplification of descriptions and does not indicate or imply that the indicated apparatuses or elements must have a particular orientation, or be constructed or operated in a particular orientation. Therefore, such terms shall not be understood as limiting of the present disclosure.

Further, the terms "first" and "second" are used for descriptions only and shall not be understood as indicating or implying relative importance or implicitly indicating the number of the indicated features. As a result, the features defined by "first" and "second" may explicitly or implicitly include at least one of the features. In the descriptions of the present disclosure, "several" refers to at least two, unless otherwise clearly stated.

In the present disclosure, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection or mutual communication; or direct connection or indirect connection through an intermediate medium, or may be internal communication between two elements or mutual interaction of two elements, unless otherwise stated. Those skilled in the art may understand the specific meanings of the above terms in the present disclosure according to actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

There is provided a treatment method of a leachate from hazardous waste landfill site, which includes the following steps as shown in FIG. 1.

At step 1, sodium carbonate was added to the leachate to obtain a calcium carbonate residue and a first waste liquid.

Sodium carbonate for completely removing calcium ions in the leachate was added to the leachate to allow a full reaction between sodium carbonate and the leachate and then filtered through a pressure filter to obtain a calcium carbonate residue and a first waste liquid.

Specifically, a time for the reaction between sodium carbonate and the leachate is 30 min.

Specifically, the calcium carbonate residue can be used as a neutralizer to neutralize a waste acid.

At step 2, hydrochloric acid was added to the first waste liquid and a pH value was adjusted to obtain a first mixed solution.

Specifically, the first mixed solution has a pH value of 4.0 to 6.0, preferably, 5.0.

At step 3, the first mixed solution was heated to 80° C., and then a given amount of chlorine gas was introduced to the first mixed solution while introducing air for performing blow-off reaction, and then a second waste liquid and a first mixed gas were obtained.

Specifically, the chlorine gas used above may directly come from a chlorine gas cylinder, or be prepared by electrolysis or chemical reaction. In the preparation of chlorine gas by electrolysis, an ion membrane is preferably used to electrolyze a sodium chloride solution, and sodium chloride herein may be a sodium chloride product obtained by this process. In the preparation of the chlorine gas by chemical reaction, hydrochloric acid is preferably reacted with calcium hypochlorite or sodium hypochlorite.

At step 4, the first mixed gas was introduced into an alkaline liquid absorption tower to obtain an absorption liquid, where an alkaline liquid was a 5% sodium hydroxide solution; the absorption liquid was fed into a bromine recovery apparatus for recovering bromine.

At step 5, the second waste liquid was heated to 100° C. to enable the second waste liquid to be evaporated and crystallized for about 45 min so as to obtain an evaporation condensate water and a concentrated liquid.

Specifically, the above evaporation crystallization time may change depending on a change in the contents of sodium chloride and potassium chloride in the feed liquid.

The condensate water can be discharged up to standard by biochemical treatment.

At step 6, the concentrated liquid was centrifuged and separated to obtain a sodium chloride wet salt and a centrifuged liquid.

Specifically, sodium chloride can be used as a raw material for preparing the chlorine gas by electrolysis.

At step 7, the centrifuged liquid was pumped into a cooling crystallization tank. The temperature of the cooling crystallization is 30 to 50° C., preferably, 40° C. When the liquid was cooled to the specified temperature, a potassium chloride wet salt and a final mother liquor were obtained by centrifugation.

At step 8, the final mother liquor was returned to the first waste liquid or the second waste liquid for secondary recycling treatment.

In the above treatment method of the leachate of a hazardous waste landfill site, a theoretical amount of sodium carbonate solid was added to the leachate of the hazardous waste landfill site to remove calcium and convert calcium chloride therein into calcium carbonate and sodium chloride. In this process, the content of heavy metal(calculated by Pb) could also be reduced from 50 mg/L to 5 mg/L. The calcium-removed leachate was firstly adjusted by hydrochloric acid to pH value of 4.0 to 6.0 to prevent chlorine gas from reacting with excess sodium carbonate, and then heated to above 80° C. After that, quantitative chlorine gas was introduced thereto while introducing air to blow off bromine generated by reaction out of the leachate system, so as to reduce the bromide ion content from 6560 mg/L to below 70 mg/L, greatly reducing the content of bromine in subsequent sodium chloride and potassium chloride products. The bromine-removed leachate was heated further to 100° C. and evaporated, crystallized, and separated to obtain the sodium chloride product. And then, cooled, crystallized, and separated to obtain the potassium chloride product. A final mother liquor was returned to the previous step to continue evaporation so as to increase the recovery rate of the total salt. After the mother liquor gone through 17 cycles, the recovery rate of the total salt could reach above 95%, without affecting the quality of sodium chloride and potassium chloride products.

Embodiment 1

The major ingredients of the leachate from the hazardous waste landfill site in the present embodiment were calcium chloride 10.33 wt %, sodium chloride 6.00 wt %, potassium chloride 4.96 wt %, bromide 6560 mg/L, and heavy metal (calculated by Pb) 50 mg/L, with a density of 1.15 g/cm$^3$. The specific treatment method was described below.

114 g of anhydrous sodium carbonate solid was added to 1L of leachate from the hazardous waste landfill site for 30 min of reaction and then filtered to obtain a calcium carbonate residue and a first waste liquid.

Concentrated hydrochloric acid was added dropwise to the first waste liquid to adjust a pH value to 5 to obtain a first mixed solution. The first mixed solution was heated to 80° C., and then about 3 g of chlorine gas (prepared by quantitative reaction between 17.1 g of 36% concentration hydrochloric acid and 6 g of calcium hypochlorite solid) was introduced while introducing air by an air pump to blow-off bromine generated by reaction out of the leachate system. After that, a second waste liquid and a first mixed gas were obtained, where the first mixed gas was absorbed by a 5% sodium hydroxide solution.

The second waste liquid was heated to 100° C. and evaporated for about 45 min and then stopped to obtain an evaporation condensate water and a concentrated liquid.

The concentrated liquid was centrifuged and separated to obtain a sodium chloride wet salt and a centrifuged liquid.

When the centrifuged liquid was naturally cooled to 40° C., a potassium chloride wet salt and a final mother liquor were obtained by centrifugation.

The final mother liquor was returned to the second waste liquid to continue the same subsequent steps until the mother liquor was recycled 17 times.

In the present embodiment, after the leachate from the hazardous waste landfill site gone through bromine removal procedure, the concentration of the bromide in the second waste liquid was lowered to 68.2 mg/L and sodium chloride and potassium chloride products with various indexes shown in Tables 1 and 2 were obtained when the delivered mother liquor gone through the 1st, 5th, 9th, 13rd and 17th cycles. It was found from Table 1 that the mother liquor was recycled 17 times to generate a sodium chloride product which could reach the requirement of grade 2 industrial dry salt in the chinese standard of GB/T 5462-2015 Industrial Salt, and a potassium chloride product could also reach the requirement of grade-2 product in the chinese standard of GB/T 7118-2008 Industrial Potassium Chloride. Further, the contents of bromide, which is not required in the above chinese standards were also lower than 0.013%.

TABLE 1 physico-chemical indexes of sodium chloride product

| Items | GB/T 5462-2015 Industrial dry salt index requirements | | | Various index contents of sodium chloride in different times of mother liquor recycles | | | | |
|---|---|---|---|---|---|---|---|---|
| | Excellent | Grade 1 | Grade 2 | 1 | 5 | 9 | 13 | 17 |
| Sodium chloride/(g/100 g) ≥ | 99.1 | 98.5 | 97.5 | 99.2 | 98.9 | 98.4 | 98.2 | 97.5 |
| Water/(g/100 g) ≤ | 0.30 | 0.50 | 0.80 | 0.61 | 0.47 | 0.48 | 0.34 | 0.57 |
| Water insoluble matters/(g/100 g) ≤ | 0.05 | 0.10 | 0.20 | 0.016 | 0.023 | 0.005 | 0.012 | 0.024 |
| Total amount of calcium and magnesium ions/(g/100 g) ≤ | 0.25 | 0.40 | 0.60 | 0.001 | 0.0015 | 0.0033 | 0.0013 | 0.002 |
| sulfate ions/(g/100 g) ≤ | 0.30 | 0.50 | 0.90 | <0.20 | <0.20 | <0.20 | <0.20 | <0.20 |
| Bromide/(g/100 g) | no requirements | | | 0.001 | 0.002 | 0.004 | 0.006 | 0.009 |

TABLE 2 physico-chemical indexes of potassium chloride product

| Item | GB/T 7118-2008 Industrial potassium chloride index requirements | | | Various index contents of potassium chloride in different times of mother liquor recycles | | | | |
|---|---|---|---|---|---|---|---|---|
| | Excellent | Grade 1 | Grade 2 | 1 | 5 | 9 | 13 | 17 |
| Potassium chloride/(g/100 g) ≥ | 93.0 | 90.0 | 88.0 | 97.7 | 97.4 | 97.6 | 97.1 | 97.5 |
| Sodium chloride/(g/100 g) ≤ | 1.75 | 2.60 | 3.60 | 1.66 | 1.15 | 1.16 | 2.33 | 1.44 |
| Total amount of calcium and magnesium ions/(g/100 g) ≤ | 0.27 | 0.38 | 0.45 | 0.0016 | 0.0015 | 0.0024 | 0.0021 | 0.0014 |

TABLE 2-continued physico-chemical indexes of potassium chloride product

| Item | GB/T 7118-2008 Industrial potassium chloride index requirements | | | Various index contents of potassium chloride in different times of mother liquor recycles | | | | |
|---|---|---|---|---|---|---|---|---|
| | Excellent | Grade 1 | Grade 2 | 1 | 5 | 9 | 13 | 17 |
| sulfate ions/(g/100 g) ≤ | 0.20 | 0.35 | 0.65 | <0.20 | <0.20 | <0.20 | <0.20 | <0.20 |
| Water insoluble matters/(g/100 g) ≤ | 0.05 | 0.10 | 0.15 | 0.023 | 0.099 | 0.01 | 0.101 | 0.09 |
| Water/(g/100 g) ≤ | 4.73 | 6.57 | 7.15 | 0.78 | 0.88 | 1.05 | 0.72 | 0.42 |
| Bromide/(g/100 g) | no requirements | | | 0.002 | 0.004 | 0.005 | 0.009 | 0.013 |

Embodiment 2

The major ingredients of the leachate from the hazardous waste landfill site in the present embodiment were calcium chloride 10.33 wt %, sodium chloride 6.00 wt %, potassium chloride 4.96 wt %, bromide 6560 mg/L, and heavy metal (calculated by Pb) 50 mg/L, with a density of 1.15 g/cm$^3$. The specific treatment method was described below.

114 g of anhydrous sodium carbonate solid was added to 1L of leachate from the hazardous waste landfill site for 30 min of reaction and then filtered to obtain a calcium carbonate residue and a first waste liquid.

Concentrated hydrochloric acid was added to the first waste liquid and the mixture was adjusted to a pH value of 5 and then heated to above 100° C. and evaporated for about 45 min and then stopped to obtain an evaporation condensate water and a concentrated liquid.

The concentrated liquid was centrifuged and separated to obtain a sodium chloride wet salt and a centrifuged liquid.

When the centrifuged liquid was naturally cooled to 40° C., a potassium chloride wet salt and a final mother liquor were obtained by centrifugation.

In the present embodiment, the leachate from the hazardous waste landfill site does not undergo bromine removal treatment and the content of bromide in the finally-obtained sodium chloride was as high as 0.54%, while in the potassium chloride was as high as 1.47%. In embodiment 1, under the same other conditions, the bromine removal step was added and the contents of bromide in the sodium chloride and potassium chloride products were both lower than 0.002%.

The above embodiments are illustrative and used only to explain some features of the method of the present disclosure. The appended claims are aimed to require a possibly wide scope that can be conceived of, and the embodiments presented herein are demonstrated by the true test results of the applicant. Therefore, the applicant desires that the appended claims are not limited by selection of embodiments of the features of the present disclosure. Some numerical ranges used in the appended claims include subranges therein and the changes in these subranges shall be, in possible cases, interpreted as covered by the appended claims.

What is claimed is:

1. A treatment method of a leachate from hazardous waste landfill site, comprising the following steps:
    at step 1, adding sodium carbonate for completely removing calcium ions in the leachate to the leachate for 30 min of reaction and then obtaining a calcium carbonate residue and a first waste liquid through filtration;
    at step 2, adding hydrochloric acid to the first waste liquid and adjusting a pH value to obtain a first mixed solution;
    at step 3, heating the first mixed solution to 80° C., and then introducing a given amount of chlorine gas to the first mixed solution while introducing air for performing blow-off reaction and then obtaining a second waste liquid and a first mixed gas;
    at step 4, introducing the first mixed gas into an alkaline liquid absorption tower to obtain an absorption liquid and feeding the absorption liquid into a bromine recovery apparatus for recovering bromine;
    at step 5, heating the second waste liquid to 100° C. to enable the second waste liquid to be evaporated so as to obtain an evaporation condensate water and a concentrated liquid;
    at step 6, centrifuging the concentrated liquid to obtain a sodium chloride wet salt and a centrifuged liquid;
    at step 7, pumping the centrifuged liquid into a cooling crystallization tank, such that, when the centrifuged liquid is cooled to 40° C., a potassium chloride wet salt and a final mother liquor are obtained by centrifugation;
    at step 8, returning the final mother liquor to the first waste liquid or the second waste liquid for recycling.

2. The treatment method of claim 1, wherein the first mixed solution has a pH value of 4.0 to 6.0.

3. The treatment method of claim 1, wherein the chlorine gas is prepared by chemical reaction or by electrolyzing a sodium chloride solution.

* * * * *